US010798043B2

(12) United States Patent
Yong et al.

(10) Patent No.: US 10,798,043 B2
(45) Date of Patent: Oct. 6, 2020

(54) INDICATING LIVE VIDEOS FOR TRENDING TOPICS ON ONLINE SOCIAL NETWORKS

(71) Applicant: Facebook, Inc., Menlo Park, CA (US)

(72) Inventors: Zheng Yong, Sunnyvale, CA (US); Dirk John Stoop, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 110 days.

(21) Appl. No.: 15/276,572

(22) Filed: Sep. 26, 2016

(65) Prior Publication Data

US 2018/0091468 A1   Mar. 29, 2018

(51) Int. Cl.
*H04L 12/58* (2006.01)

(52) U.S. Cl.
CPC .............. *H04L 51/32* (2013.01); *H04L 51/10* (2013.01); *H04L 51/16* (2013.01)

(58) Field of Classification Search
CPC ........... H04N 21/2187; H04N 21/4788; H04N 21/23418; H04N 21/26603; H04N 21/2668; H04N 21/4307; H04N 21/431; H04N 21/44213; H04N 21/8549; G06F 17/30477; G06F 17/30554; G06F 3/0482; G06Q 10/06; G06Q 50/01
See application file for complete search history.

(56) References Cited

U.S. PATENT DOCUMENTS

| | | | |
|---|---|---|---|
| 9,082,018 B1* | 7/2015 | Laska | G06K 9/00711 |
| 9,282,068 B1* | 3/2016 | Pan | H04N 21/2668 |
| 9,535,999 B1* | 1/2017 | Shalabi | G06F 17/211 |
| 2010/0312596 A1* | 12/2010 | Saffari | G06F 3/0481 |
| | | | 705/7.32 |
| 2012/0254917 A1* | 10/2012 | Burkitt | H04N 21/431 |
| | | | 725/40 |
| 2013/0144869 A1* | 6/2013 | Shalabi | G06F 17/211 |
| | | | 707/722 |
| 2013/0185106 A1* | 7/2013 | Donatone | G06Q 10/06 |
| | | | 705/7.14 |
| 2013/0254308 A1* | 9/2013 | Rose | H04N 21/252 |
| | | | 709/206 |
| 2013/0291019 A1* | 10/2013 | Burkitt | H04N 21/4828 |
| | | | 725/53 |
| 2014/0129559 A1* | 5/2014 | Estes | G06Q 10/10 |
| | | | 707/737 |

(Continued)

*Primary Examiner* — Jason D Recek
*Assistant Examiner* — Ranjan Pant
(74) *Attorney, Agent, or Firm* — Jordan IP Law, LLC

(57) ABSTRACT

In one embodiment, a method includes sending, to a first client system of a first user, a first trending module having references to a first set of trending topics, where one of the references does not include a live badge; generate a trending-topic interface corresponding to a first trending topic in the first set of trending topics, wherein the trending-topic interface comprises a live module containing at least one live video associated with the first trending topic; storing a reference to the live module with a news-event object; querying the news-event object to determine whether a live module is associated with the first trending topic; and sending, to a second client system for display, a second trending module having references to a second set of trending topic that includes the first trending topic, wherein a reference to the first trending topic includes a live badge.

20 Claims, 8 Drawing Sheets

(56) References Cited

U.S. PATENT DOCUMENTS

| | | | |
|---|---|---|---|
| 2014/0143687 A1* | 5/2014 | Tan | G06F 3/1462 |
| | | | 715/757 |
| 2014/0181679 A1* | 6/2014 | Sarangi | G06Q 30/02 |
| | | | 715/738 |
| 2014/0280017 A1* | 9/2014 | Indarapu | G06F 16/951 |
| | | | 707/711 |
| 2014/0365486 A1* | 12/2014 | Morris | G06F 16/907 |
| | | | 707/736 |
| 2015/0074131 A1* | 3/2015 | Fernandez | G06F 16/435 |
| | | | 707/758 |
| 2015/0128014 A1* | 5/2015 | Monroe | G06F 3/0482 |
| | | | 715/202 |
| 2016/0092551 A1* | 3/2016 | Tang | G06F 16/9535 |
| | | | 707/740 |
| 2016/0170582 A1* | 6/2016 | Nag | G06F 3/0482 |
| | | | 715/716 |
| 2016/0189042 A1* | 6/2016 | Gill | G06F 16/9535 |
| | | | 706/11 |
| 2016/0227291 A1* | 8/2016 | Shaw | H04N 21/251 |
| 2016/0232241 A1* | 8/2016 | Stoyanov | G06F 16/9535 |
| 2016/0277802 A1* | 9/2016 | Bernstein | H04N 21/4307 |
| 2016/0286244 A1* | 9/2016 | Chang | H04N 21/21805 |
| 2017/0344809 A1* | 11/2017 | Twyman | G06K 9/00288 |

* cited by examiner

INDICATING LIVE VIDEOS FOR TRENDING TOPICS ON ONLINE SOCIAL NETWORKS

TECHNICAL FIELD

This disclosure generally relates to online social networks and more particularly to accessing and streaming video content within an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may display a live badge next to a reference to a trending topic in a trending module on an online social network. A live badge may be a visual indication that the trending topic is associated with a live video (e.g., a video that is currently streaming live on the online social network). Users of the online social network may post live videos to the online social network for other users to view. A live video may also be associated with a trending topic. A trending topic may be a topic that the social-networking system determines is associated with an increase in user activity in the recent past. For example, the social-networking system may determine that a trending topic is the U.S. Open Tennis Championship because many users may have posted content related to the U.S. Open Tennis Championship in the recent past (e.g., over the last few hours or days). A user of the online social network may attend a tennis match during the U.S. Open and may post a live video of the match. In response, the social-networking system may display a live badge next to the reference to the trending topic, "U.S. Open Tennis Championship." This may be done in real time—a live badge may be displayed when a live video is posted, and may be removed when the live video has concluded.

The social-networking system may not immediately recognize when a live video is associated with a trending topic. The process by which the social-networking system may determine to display a live badge next to a reference to a trending topic may be as follows: When a user selects a reference to a trending topic that does not currently have a live badge, the social networking system may generate a trending-topic interface for corresponding to the trending topic. The trending-topic interface may include a live module containing a live video. The social-networking system may store a reference to the live module with a news-event object associated with the trending topic. Then, when a subsequent user requests a trending module (i.e., a module on a user interface of the online social network that displays references to trending topics), the social-networking system may query the news-event object for each trending topic listed in the trending module to determine whether a live module is associated with any of the trending topics. If so, the social-networking system may send to the subsequent user the trending module comprising references to a set of trending topics (which may be a different set than the prior user) that includes a live badge next to each reference to the trending topic that is associated with a live module.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
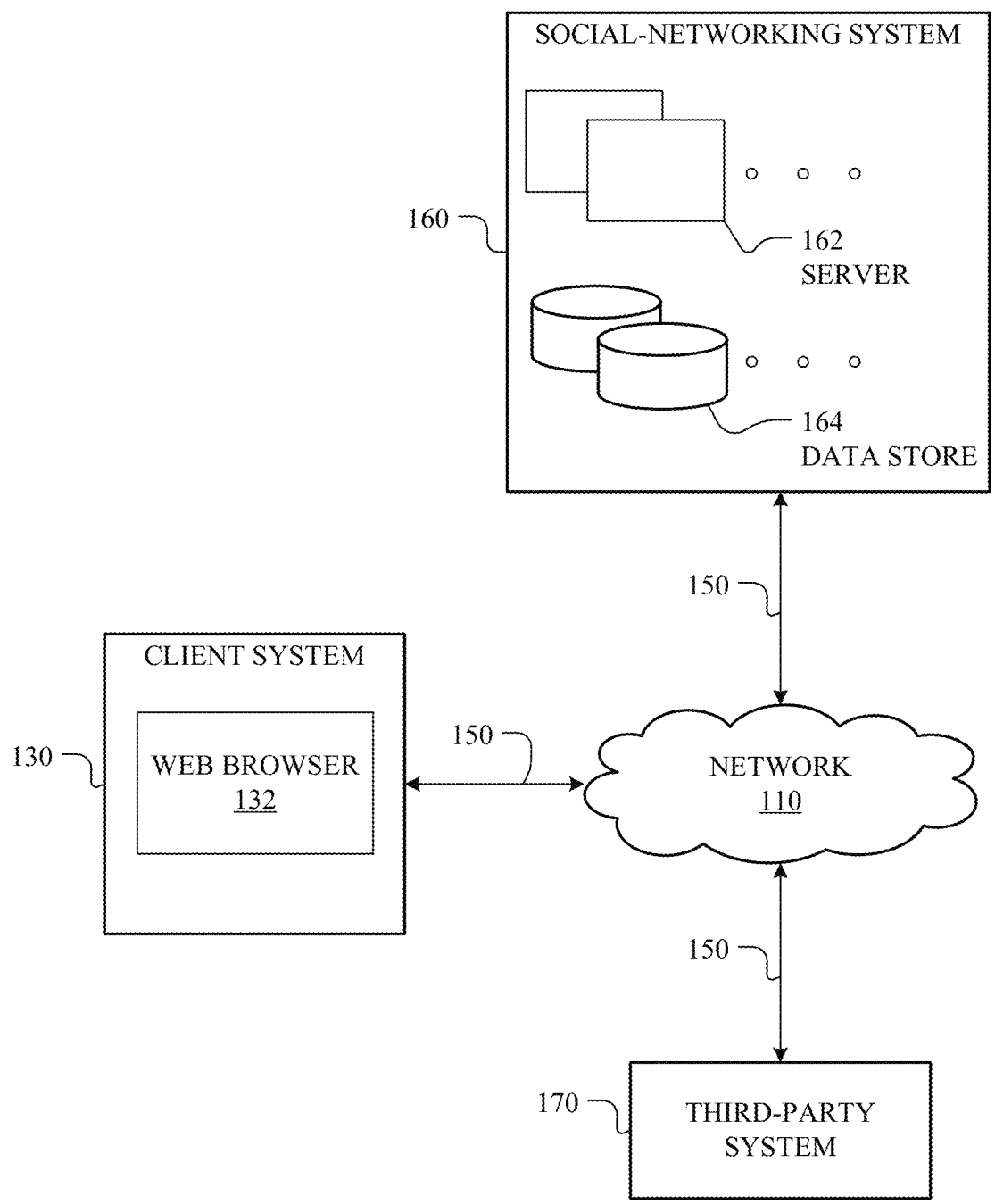
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
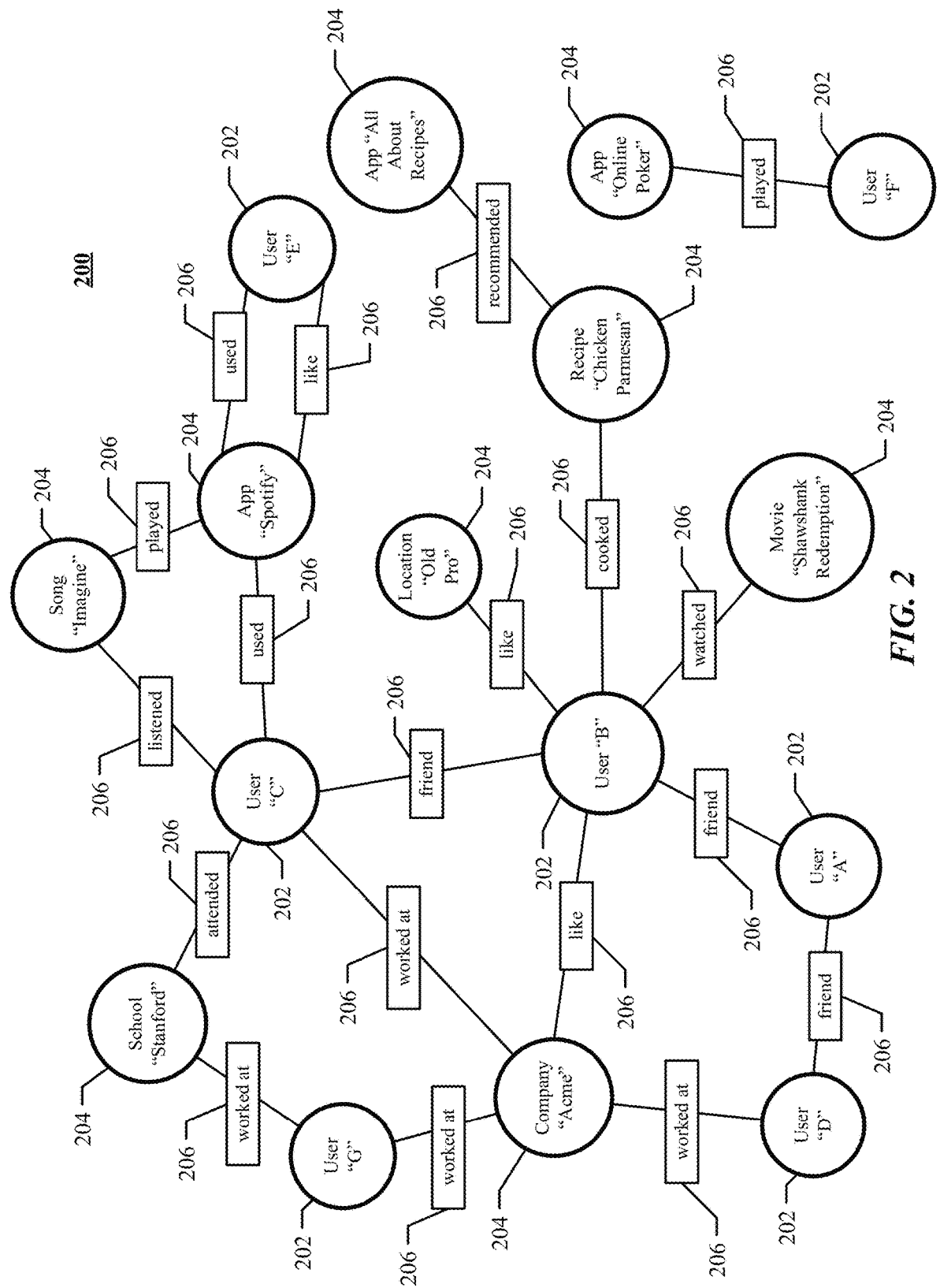
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indicating Live Videos for Trending Topics

In particular embodiments, the social-networking system 160 may display a live badge next to a reference to a trending topic in a trending module on the online social network. A live badge may be a visual indication that the trending topic is associated with a live video (e.g., a video that is currently streaming live on the online social network). Users of the online social network may post live videos to the online social network for other users to view. A live videos may also be associated with a trending topic. A trending topic may be a topic that the social-networking system 160 determines is associated with an increase in user activity in the recent past. As an example and not by way of limitation, the social-networking system 160 may determine that a trending topic is the U.S. Open Tennis Championship because many users may have posted content related to the U.S. Open Tennis Championship in the recent past (e.g., over the last few hours or days). A user of the online social network may attend a tennis match during the U.S. Open and may post a live video of the match. In response, the social-networking system 160 may display a live badge next to the reference to the trending topic, "U.S. Open Tennis Championship." This may be done in real time—a live badge may be displayed when a live video is posted, and may be removed when the live video has concluded.

The social-networking system 160 may not immediately recognize when a live video is associated with a trending topic. The process by which the social-networking system 160 may determine to display a live badge next to a reference to a trending topic may be as follows: When a user selects a reference to a trending topic that does not currently have a live badge, the social networking system 160 may generate a trending-topic interface corresponding to the trending topic. The trending-topic interface may include a live module containing a live video. The social-networking system 160 may store a reference to the live module with a news-event object associated with the trending topic. Then, when a subsequent user requests a trending module (i.e., a module on a user interface of the online social network that displays references to trending topics), the social-networking system 160 may query the news-event object for each trending topic listed in the trending module to determine whether a live module is associated with any of the trending topics. If yes, the social-networking system 160 may send to the subsequent user the trending module comprising references to a set of trending topics (which may be a different set than the prior user) that includes a live badge next to each reference to the trending topic that is associated with a live module. As another example and not by way of limitation, a trending topic may be "No Man's Sky," a popular video game. A user Ian of the online social network may upload a live video of himself playing No Man's Sky. While the live video is taking place, the social-networking system 160 may generate a trending-topic interface for the trending topic No Man's Sky and include a live module that has Ian's live video of himself playing the video game No Man's Sky. When the social-networking system 160 sends a live module that includes a reference to the trending topic No Man's Sky to another user of the online social network, a live badge may be displayed next to the reference to the trending topic No Man's Sky. When the live video has concluded and no other live videos are currently being posted that are associated with No Man's Sky, the social-networking system 160 may remove the live badge for No Man's Sky. Although this disclosure describes determining to display a live badge in a particular manner, this disclosure contemplates determining to display a live badge in any suitable manner.

In particular embodiments, the social-networking system 160 may identify a trending topic on the online social network. The social-networking system 160 may use a trending algorithm (e.g., an algorithm defined by a given platform based on its needs) to identify content that exhibits an uptick (e.g., increase) in activity that may be related to particular people, places, events, or other topics. The trending topic may be an existing topic, a new topic, two or more co-occurring topics, or a group of topics. A topic may refer to a title, description, name, or any other suitable descriptor or identifier corresponding to a particular event or subject matter. As an example and not by way of limitation, a trending topic may refer to a news event (e.g., the solidarity march in Paris in January 2015), a political event (e.g., the 2016 United States presidential election), a sporting event (e.g., the 2016 Olympic Games), an organization (e.g., the Nobel Peace Prize nominating committee), a place (e.g., Yosemite National Park), a person (e.g., Bryce Harper), a product (e.g., iPhone 7), or a restaurant (e.g., Sancho's Taqueria), or any other type of suitable event or subject matter. As an example and not by way of limitation, the identified content may be determined from posts associated with (e.g., authored by, liked by, reshared by, commented on by, or viewed by) friends or groups of the user and that are related to a particular topic (e.g., a trending topic) on the online social network. The posts may be posted by users of the online social network, which may include individuals, media organizations, groups, or any other suitable entity. More information on trending topics may be found in U.S. patent application Ser. No. 14/858,366, filed 18 Sep. 2015, which is incorporated by reference. Although this disclosure describes identifying particular trending topics in a particular manner, this disclosure contemplates identifying any suitable trending topics in any suitable manner.

In particular embodiments, the social-networking system 160 may allow users of the online social network to post live videos to the online social network that may be associated with the user's user profile, or with a group or other entity associated with the user. A live video may be a video that is uploaded in real-time as the user records the video and then displayed in real-time to other users. A live video may also be referred to as a live stream. In conjunction with recording a live video, the user may provide a description of the general subject matter of the live video in a description interface associated with the live video. As an example and not by way of limitation, a user, Ian, may post a live video of himself reviewing a videogame called "No Man's Sky." In conjunction with recording and uploading the live video, Ian may provide a description of the live video that says, "Here is my reaction to the pre-release of No Man's Sky." Although this disclosure describes posting live videos to an online social network in a particular manner, this disclosure contemplates posting live videos to an online social network in any suitable manner.

In particular embodiments, the social-networking system 160 may associate a live video with a trending topic. This association may be accomplished by a tagging-algorithm. The tagging-algorithm may identify content (e.g., live videos) matching the trending topic (e.g., key-voices, n-grams/noun phrases, related topics forming a cluster of topics). The social-networking system 160, via the tagging-algorithm, may use the description provided by the user who posted the live video to determine whether the live video is associated with any trending topics. As an example and not by way of limitation, the social-networking system 160 may analyze the description Ian provided in conjunction with his live video and recognize that the text string "No Man's Sky" appears in the description. No Man's Sky may be an entity or concept already stored with the social-networking system 160, for example, in a social graph 200. The social-networking system 160 may then compare the n-grams in "No Man's Sky" to a list of topics that are currently trending, along with any articles, posts, or other content objects that have already been associated with trending topics. Continuing the example, the social-networking system 160 may determine that Ian's live video is associated with the trending topic, "No Man's Sky." In particular embodiments, the social-networking system 160 may use other signals to associate live videos with trending topics. These signals may include using a location or time associated with the live video, recognizing words that are verbally spoken during the recording of the live video, and recognizing faces or images that appear during the recording of the live video. As an example and not by way of limitation, a user, Ben, may be attending a Warriors basketball game at Oracle Arena. He may post a live video during the Warriors game on his client system 130, which may have location tracking enabled. The social-networking system 160 may have a schedule of the Warriors' home games, and may determine that Ben's live video is being posted from inside Oracle Arena during the Warriors home game. The social-networking system 160 may use this information to associate Ben's live video with the Warriors game. Although this disclosure describes associating a live video with a trending topic in a particular manner, this disclosure contemplates associating a live video with a trending topic in any suitable manner. More information on associating content objects to topics and tagging-algorithms may be found in U.S. patent application Ser. No. 14/616,155, filed 6 Feb. 2016, which is incorporated herein by reference.

In particular embodiments, the social-networking system 160 may send, to a client system of a first user for display, a trending module. A trending module may be a section of a user interface that displays references to trending topics. Thus, a trending module may comprise references to one or more trending topics, and none of the references may include a live badge. The trending topics may comprise any suitable trending topic. As an example and not by way of limitation, the trending topics appearing in a trending module may include "Mila Kunis," "No Man's Sky," and "Chris Brown." These trending topics may not include a live badge for one of at least two reasons. First, no live videos that are associated with any of the trending topics listed in the trending module may be streaming on the online social network when the trending module is sent to the client system for display. Second, even though one or more users may be posting live videos that are associated with one or more trending topics listed in the trending module, the social-networking system 160 may not immediately recognize this fact. This may be because the social-networking system 160 may not assign a live badge to a particular reference for a trending topic in the trending module until the social-networking system 160 initially renders a trending-topic interface corresponding to a trending topic, and the trending-topic interface includes a live module that has a live video. Although this disclosure describes sending particular trending modules in a particular manner, this disclosure contemplates sending any suitable trending modules in any suitable manner.

In particular embodiments, the trending topics referenced in the trending module may be topics that have increased in popularity on the online social network within a threshold amount of time. As an example and not by way of limitation, the social-networking system 160 may identify posts and other user interaction (e.g., likes, comments, shares) that are associated with a particular topic. If the posts and other user interaction with the particular topic exceed a threshold amount or frequency (e.g., 100 posts every minute), the social-networking system 160 may identify the particular topic as a trending topic. As an example and not by way of limitation, the social-networking system 160 may identify an increase in posts and user interaction related to "Whataburger," a restaurant chain in Texas. If the posts and user interaction exceed a threshold number (e.g., 1,000 posts, 5,000 likes, 2,500 shares) within a threshold period of time (e.g., the last two hours), the social-networking system 160 may identify "Whataburger" as a trending topic on the online social network. As an alternative to an absolute number that must be exceeded for a topic to become a trending topic, in particular embodiments, topics that have an increased in popularity within a threshold amount of time may be topics that are associated with posts that have increased in proportion to usual activity. The increase in proportion may be set by the social-networking system 160 as any suitable increase. As an example and not by way of limitation, the social-networking system 160 may set a threshold for an increase in proportion as three times the typical amount of posts for a given topic. Continuing the "Whataburger" example, on a typical day, posts associated with "Whataburger" may be posted to the online social network 100 times a day. If the threshold for an increase in proportion is three times the typical amount, then when the number of posts associated with "Whataburger" exceeds 300 posts, "Whataburger" may become a trending topic. In particular embodiments, the criteria for a topic to become a trending topic may be a combination of an absolute number of posts or other user interaction (e.g., at least 1,000 posts) and an increase in proportion (e.g., at least three times the usual amount of posts). Although this disclosure describes identifying a trending topic in a particular manner, this disclosure contemplates identifying a trending topic in any suitable manner.

Figure 3:
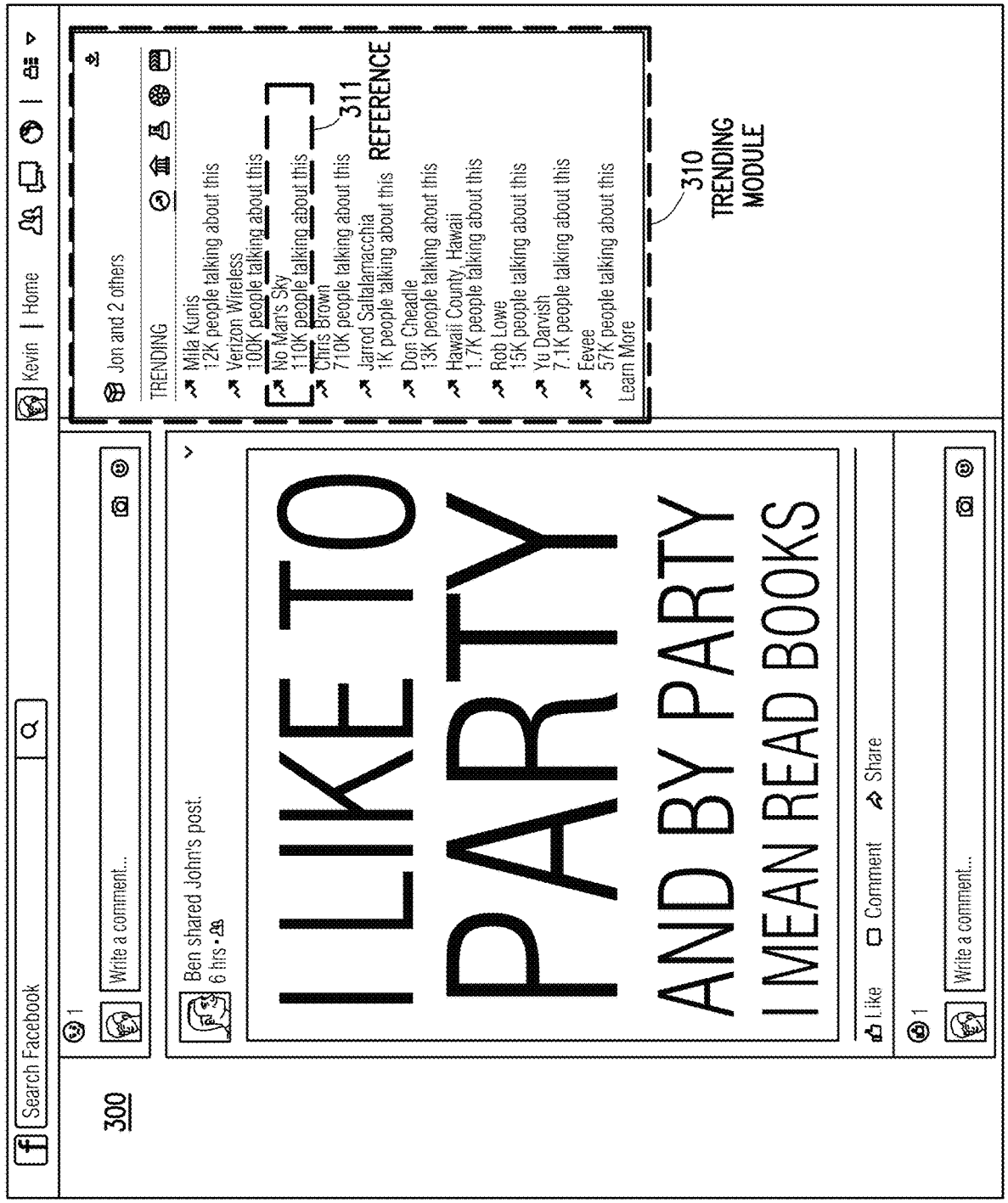
FIG. 3 illustrates an example user interface with an example trending module.

FIG. 3 illustrates an example user interface 300 with an example trending module 310. The trending module 310 may contain one or more references 311 to one or more trending topics. As an example and not by way of limitation, a user interface associated with a user, Kevin, may display a trending module 310 comprising a plurality of references 311, wherein each reference is associated with a trending topic. Example trending topics may include "Mila Kunis," "No Man's Sky," and "Chris Brown." When a user selects one of the references 311 to a trending topic, the social networking system may display a trending topic interface to the user. In particular embodiments, the trending module 310 may not display any live badges in association with any of the references 311. The social-networking system 160 may not display live badges in association with a reference 311 in the trending module 310 for the reasons described previously. Although this disclosure describes displaying a trending module in a particular manner, this disclosure contemplates displaying a trending module in any suitable manner.

In particular embodiments, the social-networking system 160 may generate, in response to receiving an indication that a user has selected a trending topic from the trending module, a trending-topic interface corresponding to the trending topic. The trending-topic interface may comprise a live module containing at least one live video associated with the trending topic. To generate the trending-topic interface, the social-networking system 160 may identify one or more search results that match the trending topic. These search results may be categorized into one or more search-result modules. Examples of search-result modules include "Photos & Videos," "Top Posts," "Posts from Friends and Groups," "Public Posts," and "Live." Each search-result module may be separately generated by a different process of the social-networking system 160. A search-result module may be a grouping of objects (e.g., user profiles, posts, live videos, photos) or references to objects identified in response to a search query. When a user selects a reference 311 to a trending topic in trending module 310, the social-networking system 160 may treat this selection as a search query, with the text of the search query being the text of the reference 311, plus some optional text. As an example and not by way of limitation, a trending topic on the online social network may be "Iceland." Because it is a trending topic, Iceland may appear in the list of trending topics in trending module 310. The first user may select "Iceland" from the trending module 310. The social-networking system 160 may treat this selection as a search query for "iceland" plus some optional text (e.g., "iceland northern lights"). In response to the search query from the first user, the social-networking system 160 may return one or more search results comprising content objects (e.g., user posts, photos, videos, news articles) that match the search query. These search results may be organized and categorized into different search-result modules based on their type. As an example and not by way of limitation, the search results for the search query "iceland" may be organized into the following search-result modules: "Posts from Friends and Groups," "Top Posts," "Public Posts," and "Live." These categories may be ranked on a search results page according to various criteria (e.g., user interaction data). As an example, the module "Posts from Friends and Groups" is typically ranked higher than the module "Public Posts." The social-networking system 160 may generate a live module if one or more live videos are associated with the search results matching the search query. As an example and not by way of limitation, if one or more live videos match a search query for "iceland," the social-networking system 160 may generate a live module and populate the live module with the live videos that are associated with Iceland. Although this disclosure describes sending particular trending-topic interfaces in a particular manner, this disclosure contemplates sending any suitable trending-topic interfaces in any suitable manner. More information about search-result modules may be found in patent application Ser. No. 14/244,748, filed 3 Apr. 2014, which is incorporated herein by reference.

Figure 4:
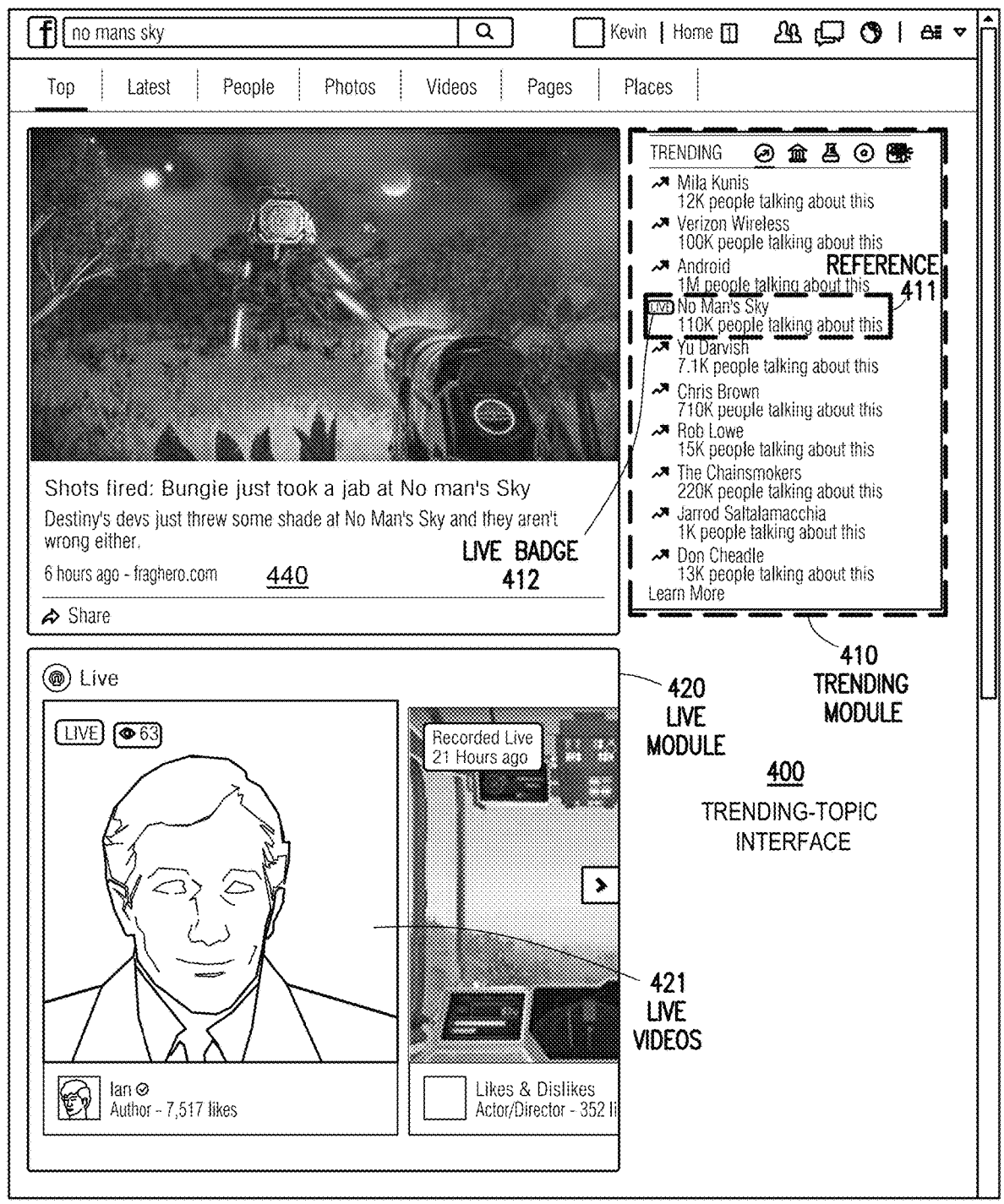
FIG. 4 illustrates an example trending-topic interface with an example live module.

FIG. 4 illustrates an example trending topic-interface 400 with an example live module 420. In this example, the trending topic is "No Man's Sky," a popular video game. The trending-topic interface 400 may comprise one or more search results for the search query "no mans sky," which the social-networking system 160 may have automatically input in response to a user selecting the reference to the trending topic "No Man's Sky" in trending module 310. The search results may comprise one or more search modules, including context module 440 and live module 420. In particular embodiments, the trending-topic interface may further comprise one or more of a top-posts module, a public-posts module, or a friends-and-groups module (e.g., "Posts from Friends and Groups"). Live module 420 may comprise one or more live videos 421. In particular embodiments, the live videos 421 may have been posted by another user of the online social network that may or may not be connected to the first user in a social graph maintained by the social-networking system 160. As an example and not by way of limitation, a first user, Kevin, may be a user of the online social network and may select "No Man's Sky" from the trending module 310. In response, the social-networking system 160 may send, to Kevin's client system for display, the trending-topic interface 400, which may include live module 420, which in turn may include a live video 421 posted by Ian, another user of the online social network. Ian and Kevin may or may not be connected to each other on the social graph 200 maintained by the social-networking system 160. In particular embodiments, the trending-topic interface 400 may also comprise trending module 410, one or more references 411 to one or more trending topics, and a live badge 412. The live badge 412 may be a visual element that indicates that a trending topic is associated with at least one live video. As an example and not by way of limitation, live badge 412 next to the reference 411 for No Man's Sky may indicate that there is at least one live video associated with No Man's Sky on the online social network. In particular embodiments, the social-networking system 160 may determine to display a live badge next to the reference 411 for No Man's Sky by performing some or all of the steps described herein. Although this disclosure describes sending a trending-topic interface to a client device for display in a particular manner, this disclosure contemplates sending a trending-topic interface to a client device for display in any suitable manner.

In particular embodiments, the social-networking system 160 may store a reference to the live module with a news-event object associated with the trending topic. This step may be performed by the social-networking system 160 either before or after the first user has selected the trending topic from the trending module. To perform this step before, the social-networking system 160 may automatically generate a trending-topic interface for at least some of the trending topics on the online social network. There may be more trending topics on the online social network than those displayed in trending module 310, because trending module 310 may be customized for each user based on that user's social graph information and affinity coefficients for various concepts, content objects, and users. As an example and not by way of limitation, if a user Brittany has viewed, liked, shared, commented on, or otherwise interacted with content related to extreme sports (e.g., surfing, motocross, rock climbing), the social networking system 160 may display more references to trending topics that are related to extreme sports in trending module 310 for Brittany than for another user, Alex, who has interacted more with content related to Hollywood movie stars. The trending module 310 for Alex may contain more references to Hollywood actors than to extreme sports. Although the trending topics in trending module 310 may be customized for each user, there may be a finite amount of trending topics on the online social network at any given time. Thus, the social-networking system 160 may automatically generate a trending-topic interface for one or more trending topics. Alternatively, the social-networking system 160 may store a reference to the live module with a news-event object associated with the trending topic in response to the first user selecting the trending topic in trending module 310. A news-event object may be an object, generated and maintained by the social-networking 160, that contains information related to a news event. As an example and not by way of limitation, the social-networking system 160 may generate a news-event object for the release of the videogame No Man's Sky (i.e., the news event). The information related to the news event may include a seed post, which may be an initial post or article about the news event and which may be used as the basis of identifying posts that match the trending topic corresponding to the news event. As an example and not by way of limitation, the seed post for the release of No Man's Sky may be an article published by Gamespot (a popular videogame website) called "No Man's Sky: Everything You Need to Know." This seed post may comprise information related to No Man's Sky, including keywords, important dates, and other relevant information. The social-networking system 160 may use the seed post or other suitable information to associate posts and content objects (e.g., live videos) that match the trending topic corresponding to the news event. As an example and not by way of limitation, a user, Ian may upload a live video related to No Man's Sky. Using a tagging-algorithm and the seed post for No Man's Sky, the social-networking system 160 may associate Ian's live video with the trending topic No Man's Sky. In response to this association, the social-networking system 160 may generate a live module comprising Ian's live video along with other live videos that have been associated with No Man's Sky. The social-networking system 160 may also store a reference to the live module with the news-event object. This may be accomplished by storing a pointer to the live module with the news-event object for the release of No Man's Sky, or by storing some other suitable indication with the news-event object that the search results for the trending topic No Man's Sky has a live module with at least one live video. In particular embodiments, the news-event object may be associated with a cache that stores information related to the trending topic. As an example and not by way of limitation, the news-event object may be stored on a cache either locally on the client system 130, or on a remote server maintained by the social-networking system 160. Storing the news-event object in a cache may shorten the time required to access the data associated with the news-event object, reduce latency, and improve general performance of the system. Although this disclosure describes storing a reference to a live module with a news-event object in a particular manner, this disclosure contemplates storing a reference to a live module with a news-event object in any suitable manner. More information on news-event objects and tagging-algorithms may be found in U.S. patent application Ser. No. 14/616,155, filed 6 Feb. 2016, which is incorporated herein by reference.

In particular embodiments, the social-networking system 160 may query the news-event object for each trending topic listed in the trending module. The query may be made in response to receiving a request from a client system of a subsequent user for a second trending module. The query may determine whether a live module is associated with any of the trending topics in the trending module. The request from the client system of the subsequent user may occur when the user opens a webpage that has the trending module. As an example and not by way of limitation, the social-networking system 160 may receive a request from a user, Briana, for a trending module. Briana's request may occur when Briana opens a webpage that displays the trending module. In response to this request, the social-networking system 160 may, for each trending topic in the trending module, query the news-event object that is associated with the trending topic. In particular embodiments, the social-networking system 160 may query the news-event object either before or after the reference has been stored with the news-event object. Although this disclosure describes querying a news-event object in a particular manner, this disclosure contemplates querying a news-event object in any suitable manner.

In particular embodiments, determining whether the live module is associated with the trending topic comprises determining that the reference to the live module is associated with the news-event object, wherein the reference to the live module indicates that the trending-topic interface has previously been generated with a live module. The query that determines this criteria may comprise one or more binary queries. As an example and not by way of limitation, the one or more binary queries for a particular trending topic may be: (1) is there a reference to a live module stored with the news-event object for the particular trending topic? (2) Is the reference to the live module associated with the trending topic? And (3) does the reference to the live module indicate that the trending-topic interface has previously been generated with a live module? Alternatively, the social-networking system 160 may query another set of suitable questions that enable it to determine if a trending-topic interface for the particular trending topic has been rendered with a live module. If the social-networking system 160 determines that a trending-topic interface for the particular trending topic has, in fact, been rendered with a live module (e.g., by determining that the three queries described above are true), then the social-networking system 160 may display a live badge next to the trending topic associated with the news-event object. If not, then the social-networking system 160 may not display a live badge next to the trending topic associated with the news-event object. As an example and not by way of limitation, the social-networking system 160 may receive a request from Briana for a second trending module. The second trending module may include the following trending topics: "Philadelphia Zoo," "Rae Carruth," and "No Man's Sky." The social-networking system 160 may have previously generated news-event objects for each of these trending topics. The social-networking system 160 may query the news-event object associated with each of these trending topics to determine whether a reference to a live module has been stored with the news-event object. If a reference to a live module has been stored with a particular news-event object, and, optionally, if the reference to the live module indicates that the trending-topic interface has previously been rendered with a live module, it may be determined that the trending topic associated with the news-event object has a trending-topic interface that comprises a live module. Continuing the above example, the social-networking system 160 may query the news-event objects for the Philadelphia Zoo, Rae Carruth, and No Man's Sky. The news-event objects for the Philadelphia Zoo and Rae Carruth may return an indication that no reference to a live module has been stored with those news-event objects. But the social-networking system 160 may determine that the news-event object for the trending topic "No Man's Sky" does have a reference to a live module stored with it. This may mean that a live module is associated with the trending topic "No Man's Sky." Although this disclosure describes determining whether a live module is associated with a trending topic in a particular manner, this disclosure contemplates determining whether a live module is associated with a trending topic in any suitable manner.

In particular embodiments, the social-networking system 160 may, responsive to the at least one live video 421 in the live module 420 concluding, remove the reference to the live module with the news-event object associated with the trending topic. When all the live videos in the live module in a trending-topic interface for a particular trending topic have concluded, the social-networking system 160 may remove the reference to the live module stored with the news-event object for the particular trending topic. This may cause the live badge to be removed when other second users request other second trending modules. As an example and not by way of limitation, with reference to FIG. 4, when all the live videos 421 in live module 420 have concluded and no more live videos are being posted that are associated with No Man's Sky, the social-networking system 160 may remove the reference to the live module that was stored with the news-event object for the release of No Man's Sky. As a result, when other users request a trending module and a reference to No Man's Sky appears as on of the trending topics in the trending module, the social-networking system 160 may query the news-event object associated with the release of No Man's Sky and determine that a reference to a live module is not stored with the news-event object, and a live badge may not be displayed next to the reference to No Man's Sky in the trending module. Similarly, continuing with this example, a live module may not be generated for the trending-topic interface for No Man's Sky. Although this disclosure describes removing a reference to a live module stored with the news-event object in a particular manner, this disclosure contemplates removing a reference to a live module stored with the news-event object in any suitable manner.

In particular embodiments, a subsequent user may request a trending module from the social-networking system 160 for display on her client system 130. This may occur when the subsequent user opens a web application associated with the online social network. In response to this request, the social-networking system 160 may send, to the subsequent user's client system 130 for display, a second trending module comprising references to a second set of trending topics. The second set of trending topics may include the first trending topic, and the reference to the first trending topic may include a live badge. In this case, the live badge may be included in response to determining that the live module is associated with the first trending topic. This may be seen with reference to FIG. 5, which illustrates an example user interface 500 with an example trending module 510 and an example live badge 512. The trending module 510 may include references 511 to one or more trending topics. The trending topics may be customized for the second user based on the second user's social graph information. If, in the previous step, the social-networking system 160 determined that a reference to a live module is stored with a news-event object associated with a trending topic that appears in trending module 510, the social-networking system 160 may display a live badge next to the appropriate reference. As an example and not by way of limitation, the social-networking system 160 may determine that a reference to a live module is stored with the news-event object for the release of No Man's Sky. As a result, when the social-networking system 160 sends to a second client system 130 a trending module 510 that includes a reference 511 to No Man's Sky, the social-networking system 160 may also send a live badge 512 for display next to the reference 511 to No Man's Sky. As mentioned previously, a live badge may be a visual element indicating that the first tending topic is associated with at least one live video. The live badge 512 may indicate to a user that by selecting the reference 511 that has a live badge 512 next to it, the user may view at least one live video associated with the trending topic referenced by reference 511. Although this disclosure describes sending a second trending module comprising a live badge in a particular manner, this disclosure contemplates sending a second trending module comprising a live badge in any suitable manner.

Figure 6:
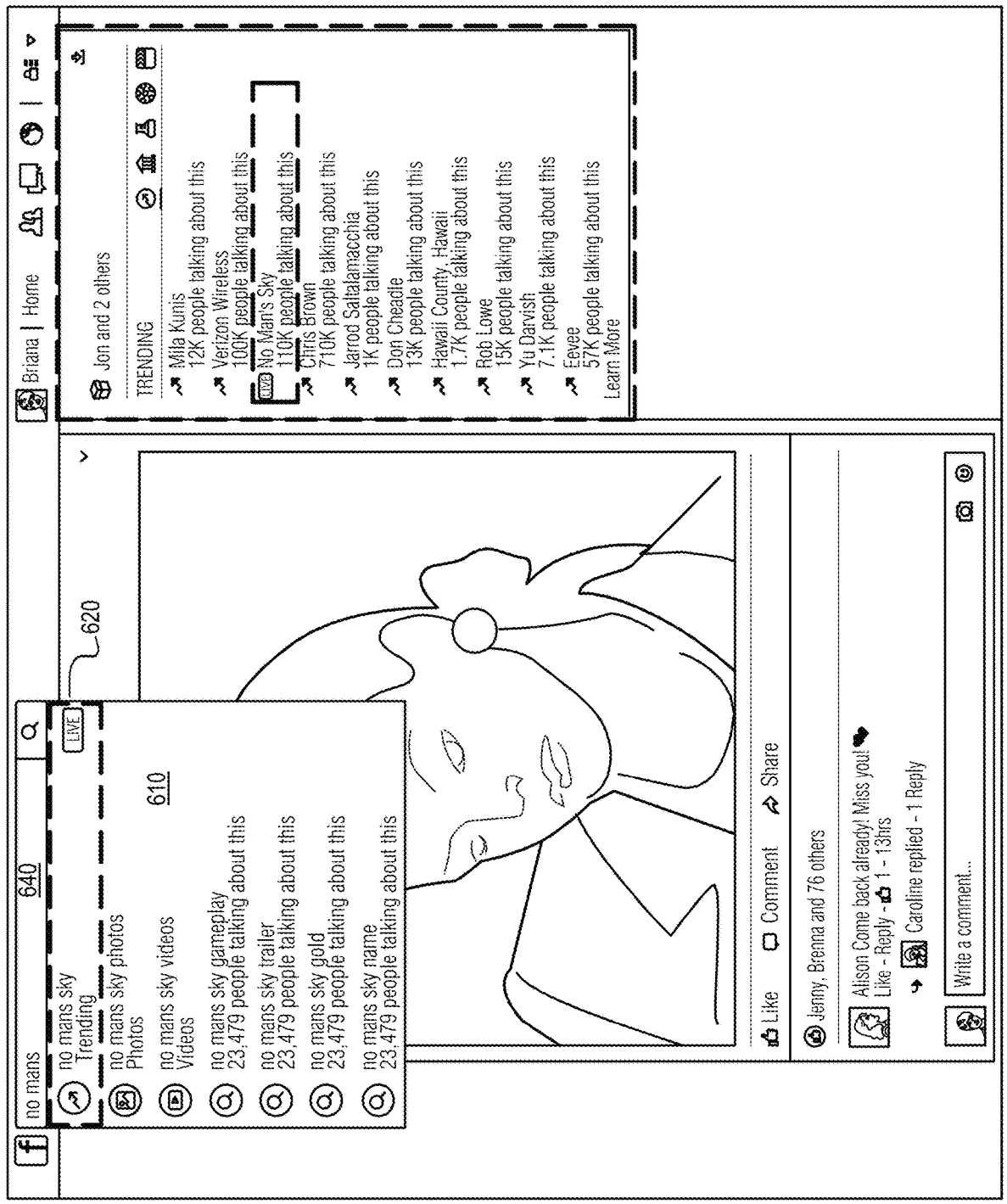
FIG. 6 illustrates an example typeahead feature that displays an example live badge.

FIG. 6 illustrates an example typeahead interface 610 that displays an example live badge 620 next to a reference to a trending topic. In particular embodiments, the social-networking system 160 may display a live badge in a typeahead feature on the online social network. As discussed previously, in particular embodiments, as a user is entering text in a query field, the typeahead feature may attempt to match the string of textual characters being entered in the query field to strings of characters (e.g., names, descriptions) corresponding to users, concepts (e.g., pages, multimedia content, trending topics), or edges and their corresponding elements in the social graph 200. In particular embodiments, when a match is found, the typeahead feature may automatically populate the query field or a dropdown list with a reference to the social-graph element (such as, for example, the node name/type, node ID, edge name/type, edge ID, or another suitable reference or identifier) of the existing social-graph element. As an example and not by way of limitation, if a user enters the text "no mans" into the query field 640, the social-networking system 160 may match "no mans" to strings of characters corresponding to the trending topic "No Man's Sky." If a live video associated with No Man's Sky is currently being posted on the online social network and if the trending-topic page for No Man's Sky has already been rendered with a trending module and all other relevant criteria have been met, the social-networking system 160 may send to the client system 130 for display a typeahead interface 610 that includes a live badge 620 next to the reference, which may be a reference to the trending-topic interface for No Man's Sky. Although this disclosure describes a providing a typeahead interface in a particular manner, this disclosure contemplates providing a typeahead interface in any suitable manner.

Figure 5:
FIG. 5 illustrates an example user interface with an example trending module and an example live badge.

In particular embodiments, the social-networking system 160 may rank the trending topics that appear in a trending module, wherein trending topics that are associated with live badges are up-ranked relative to the other trending topics in the trending module. With reference to FIG. 5, the trending module 510 may comprise a plurality of references 511 that may appear in a particular order. The order of the references 511 may also be referred to as their rank. The social-networking system 160 may rank the references 511 according to one or more ranking algorithms that take into account various factors, including user click-through data, the number of people talking about the particular trending topic referenced by reference 511, the recency of the trending topic (e.g., if the trending topic is an event that happened recently, it may be ranked higher than older events), and social graph information (e.g., affinity coefficient to various topics). Another factor that may affect the ranking of a reference 511 is whether it is associated with a live badge. References 511 that have live badges next to them may be up-ranked relative to references 511 that do not have live badges. This may be because a user is more likely to select a reference that has a live badge. Up-rank may mean that the reference is ranked higher with a live badge than it would normally be ranked without the live badge. As an example and not by way of limitation, a particular reference 511 to the trending topic Pokémon Go may be ranked in the fourth position in the trending module 510, wherein the reference 511 to the trending topic Pokémon Go may not have a live badge next to it. At another point in time, if the reference 511 to Pokémon Go does have a live badge next to it, it may be ranked higher in the trending module 510 (e.g., in the third, second, or first position). Although this disclosure describes up-ranking a reference to a trending topic in a particular manner, this disclosure contemplates up-ranking a reference to a trending topic in any suitable manner.

In particular embodiments, the social-networking system 160 may remove one or more live videos from the live module based on one or more engagement metrics. The engagement metrics may comprise user click-through data, likes, shares, or comments. It may be desirable to remove those live videos that are of poor quality, irrelevant, or otherwise uninteresting to users of the online social network. To determine which videos to remove, the social-networking system 160 may consider several metrics that are related to user engagement, including click-through data, likes, shares, or comments. If any, some, or all of these metrics fall below a threshold metric for a particular live video, the social-networking system 160 may remove the live video from the live module. In particular embodiments, the removed live video may still be visible on the online social network, but may not be included in the live module in the trending-topic interface for the trending topic. As an example and not by way of limitation, a trending topic interface 400 may include a live module 420 that has three live videos 421: Ian's live video, Fred's live video, and Samantha's live video. Fred's live video may have relatively few likes, shares, comments, and views compared to Ian's and Samantha's live video. If the engagement metrics for Fred's live video fall below a threshold level (e.g., 5 likes, 10 views), the social-networking system 160 may remove Fred's live video from the live module 420. Additionally or alternatively, the social-networking system 160 may consider the quality of the images or audio of the live video when determining whether to remove the live video. If the quality of the images or audio of the live video falls below a threshold quality, the social-networking system 160 may remove Fred's live video from the live module 420. Although this disclosure describes removing a live video from a live module in a particular manner, this disclosure contemplates removing a live video from a live module in any suitable manner.

Figure 7:
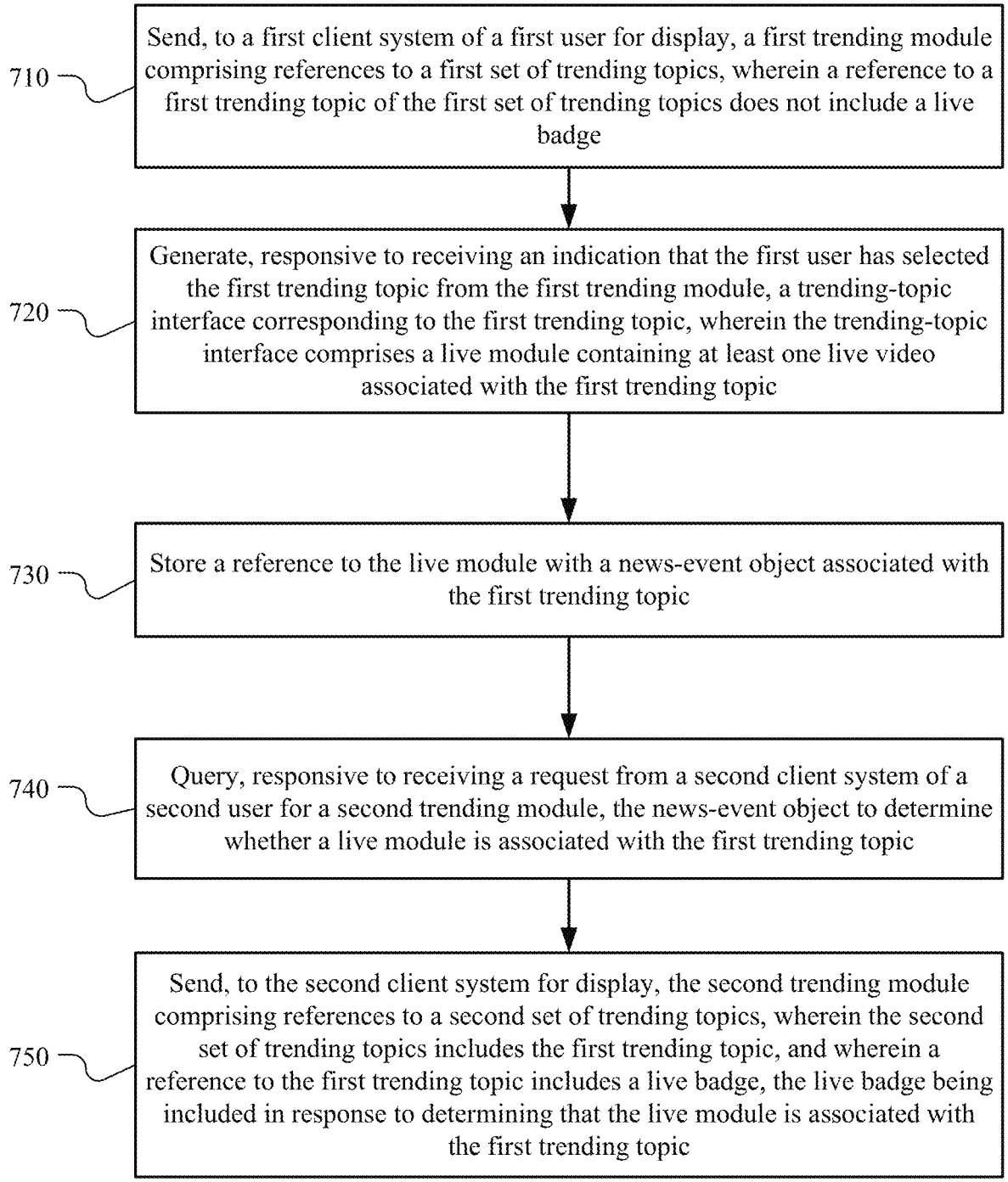
FIG. 7 illustrates an example method 700 for determining to display a live badge in association with a reference to a trending topic.

FIG. 7 illustrates an example method 700 for displaying a live badge next to a reference to a trending topic in a trending module on a social networking website. The method may begin at step 710, where the social-networking system 160 may send, to a first client system of a first user for display, a first trending module comprising references to a first set of trending topics, wherein a reference to a first trending topic of the first set of trending topics does not include a live badge. At step 720, the social-networking system 160 may generate, responsive to receiving an indication that the first user has selected the first trending topic from the first trending module, a trending-topic interface corresponding to the first trending topic, wherein the trending-topic interface comprises a live module containing at least one live video associated with the first trending topic. At step 730, the social-networking system 160 may store a reference to the live module with a news-event object associated with the first trending topic. At step 740, the social-networking system 160 may query, responsive to receiving a request from a second client system of a second user for a second trending module, the news-event object to determine whether a live module is associated with the first trending topic. At step 750, the social-networking system 160 may send, to the second client system for display, the second trending module comprising references to a second set of trending topics, wherein the second set of trending topics includes the first trending topic, and wherein a reference to the first trending topic includes a live badge, the live badge being included in response to determining that the live module is associated with the first trending topic. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for displaying a live badge next to a reference to a trending topic in a trending module on a social networking website including the particular steps of the method of FIG. 7, this disclosure contemplates any suitable method for displaying a live badge next to a reference to a trending topic in a trending module on a social networking website including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 8:
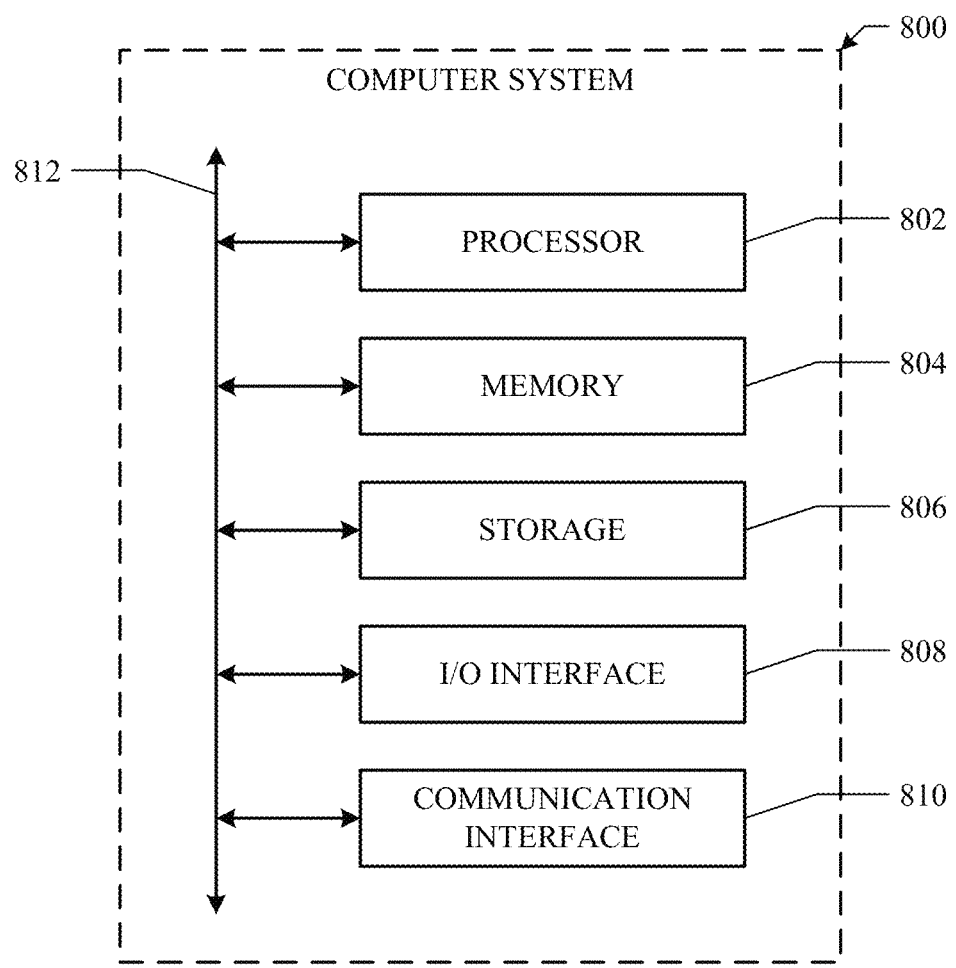
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM).

Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
sending, to a first client system of a first user for display, a first trending module that includes references to a first set of trending topics that have one or more topics associated with an increase in recent user activity, each of the one or more topics being associated with one or more content objects by a topic tagging-algorithm, wherein a reference to a first trending topic of the first set of trending topics does not include a live badge;
generating, responsive to receiving an indication that the first user has selected the first trending topic from the first trending module, a trending-topic interface corresponding to the first trending topic and which includes a live module containing at least one live video associated with the first trending topic;
storing a reference to the live module with a news-event object corresponding to the first trending topic;
receiving, after storing the reference, a request for a second trending module from a second client system of a second user;
accessing, responsive to receiving the request, the news-event object corresponding to the first trending topic;
determining, after accessing the news-event object and based on the news-event object containing the reference to the live module associated with the first trending topic, that the live module is associated with the first trending topic;

generating, responsive to determining that the live module is associated with the first trending topic, a live badge within the second trending module for the first trending topic, the live badge indicating the first trending topic is associated with the live module;

sending, to the second client system for display, the second trending module comprising references to a second set of trending topics that includes the first trending topic, and wherein a reference to the first trending topic includes the live badge; and removing, responsive to one or more engagement metrics falling below a threshold metric, a live video in the one or more live videos from the live module.

2. The method of claim 1, wherein the live badge comprises a visual element in the trending module indicating that the first trending topic is associated with the at least one live video.

3. The method of claim 2, wherein the live badge is displayed proximal to the reference to the first trending topic in the second trending module.

4. The method of claim 1, wherein:
the first user is a user of an online social network, and
the live video associated with the first trending topic has been posted by another user of the online social network.

5. The method of claim 1, wherein the trending-topic interface further comprises one or more search results matching the first trending topic.

6. The method of claim 1, wherein the trending-topic interface further comprises one or more of a top-posts module, a public-posts module, or a friends-and-groups module.

7. The method of claim 1, wherein the first set of trending topics comprises topics that have increased in popularity in an online social network within a threshold amount of time.

8. The method of claim 1, wherein the trending-topic interface further comprises a context module that comprises one or more references to content objects associated with the first trending topic.

9. The method of claim 8, wherein at least one of the content objects referenced in the context module is a live video.

10. The method of claim 1, further comprising ranking the second set of trending topics, wherein the first trending topic is up-ranked relative to the other trending topics in the second set of trending topics based on being associated with a live module.

11. The method of claim 1, wherein the news-event object is associated with a cache that stores information related to the first trending topic.

12. The method of claim 1, wherein:
determining whether the live module is associated with the first trending topic comprises determining that the reference to the live module is associated with the news-event object, and
the reference to the live module indicates that the trending-topic interface has previously been generated with a live module.

13. The method of claim 1, further comprising, responsive to the at least one live video concluding, removing the reference to the live module with the news-event object associated with the first trending topic.

14. The method of claim 1, wherein each trending topic describes one of a news event, a political event, a sporting event, an organization, a place, a person, a product, or a restaurant.

15. The method of claim 1, wherein:
the first set of trending topics is customized for the first user based on social graph information of the first user; and
the second set of trending topics is customized for the second user based on social graph information of the second user.

16. The method of claim 1, wherein the reference to the first trending topic is a textual reference.

17. The method of claim 16, wherein the indication that the first user has selected the first trending topic from the first trending module comprises an indication that the first user has clicked on the textual reference to the first trending topic.

18. The method of claim 1, further comprising removing, in response to images or audio of the live video falling below a threshold metric, a live video in the one or more live videos from the live module.

19. One or more computer-readable non-transitory storage media embodying software, that is operable when executed to:
send, to a first client system of a first user for display, a first trending module that includes references to a first set of trending topics that have one or more topics associated with an increase in recent user activity, each of the one or more topics being associated with one or more content objects by a topic tagging-algorithm, wherein a reference to a first trending topic of the first set of trending topics does not include a live badge;
generate, responsive to receiving an indication that the first user has selected the first trending topic from the first trending module, a trending-topic interface corresponding to the first trending topic and which includes a live module containing at least one live video associated with the first trending topic;
store a reference to the live module with a news-event object corresponding to the first trending topic;
receive, after storing the reference, a request for a second trending module from a second client system of a second user;
access, responsive to receiving the request, the news-event object corresponding to the first trending topic;
determine, after accessing the news-event object and based on the news-event object containing the reference to the live module associated with the first trending topic, that the live module is associated with the first trending topic;
generate, responsive to determining that the live module is associated with the first trending topic, a live badge within the second trending module for the first trending topic, the live badge indicating the first trending topic is associated with the live module;
send, to the second client system for display, the second trending module comprising references to a second set of trending topics that includes the first trending topic, and wherein a reference to the first trending topic includes the live badge; and
remove, responsive to one or more engagement metrics falling below a threshold metric, the one or more live videos from the live module.

20. A system comprising:
one or more processors; and
a non-transitory memory coupled to the processors comprising instructions executable by the processors, the processors operable when executing the instructions to:
send, to a first client system of a first user for display, a first trending module that includes references to a first set of trending topics that have one or more topics associated with an increase in recent user activity, each of the one or more topics being associated with one or more content objects by a topic tagging-algorithm, wherein a reference to a first trending topic of the first set of trending topics does not include a live badge;

generate, responsive to receiving an indication that the first user has selected the first trending topic from the first trending module, a trending-topic interface corresponding to the first trending topic and which includes a live module containing at least one live video associated with the first trending topic;

store a reference to the live module with a news-event object corresponding to the first trending topic;

receive, after storing the reference, a request for a second trending module from a second client system of a second user;

access, responsive to receiving the request, the news-event object corresponding to the first trending topic;

determine, after accessing the news-event object and based on the news-event object containing the reference to the live module associated with the first trending topic, that the live module is associated with the first trending topic;

generate, responsive to determining that the live module is associated with the first trending topic, a live badge within the second trending module for the first trending topic, the live badge indicating the first trending topic is associated with the live module;

send, to the second client system for display, the second trending module comprising references to a second set of trending topics that includes the first trending topic, and wherein a reference to the first trending topic includes the live badge; and remove, responsive to one or more engagement metrics falling below a threshold metric, the one or more live videos from the live module.

\* \* \* \* \*